Patented June 3, 1947

2,421,627

UNITED STATES PATENT OFFICE 2,421,627

RUBBERLIKE SUBSTANCES AND COMPOUNDING MATERIAL

Clifford Granville La Crosse, Baltimore, Md.

No Drawing. Application February 10, 1944, Serial No. 521,821

5 Claims. (Cl. 260—23)

This invention relates to rubber-like substances, and to materials such as are used for improving the processing characteristics and physical properties of rubber-like substances. The invention relates more especially to a reinforcing compounding material for GR–S (Buna S), a rubbery copolymer of butadiene and styrene, but it is suitable for use in natural rubber, in reclaimed rubber, and in certain rubber substitutes or so-called synthetic rubbers other than GR–S.

It is an object of the invention to provide an improved reinforcing compounding material for increasing the tensile strength and elongation of GR–S without adversely affecting any of its other characteristics. Since the material is also suitable for rubber, reclaim, and various "synthetic rubbers," it may be said that in its broadest aspects it is an object of the invention to provide an improved material for use in compounding rubber and rubber substitutes.

The compounding material of this invention not only increases tensile strength and elongation of the rubber or rubber substitutes with which it is used but improves the processing and dispersing characteristics, has exceptionally good electrical properties, and results in good extrusion. The compounding material is highly resistant to water; its water resistance being comparable to that of GR–S.

The invention comprises a material made up of a hard styrene type resin and tall oil. The preferred resin is that sold under the grade name "No. 480" by the Pennsylvania Industrial Chemical Company. This #480 resin is based on a cut of coal tar type solvent naphtha, which contains styrene, methyl styrene, and coumarone and indene, and is not further purified before it is polymerized. This resin is composed primarily of styrene and contains, in addition to the polymers of styrene, polymers of the various isomeric forms of methyl styrene, and in addition contains polymers of coumarone and indene with the polymers of styrene predominating in the composition.

Tall oil is a by-product of the soda and sulfate pulp industry. Tall oil consists of approximately 45–60% fatty acid, 30–45% rosin Ac (abietic), 7–11% unsaponifiable matter impurities, and water. The fatty unsaponifiable matter contains sulphur compounds (mercaptan).

A smoother product is obtained by using refined tall oil such as is sold under the trade name of "Liqro" by the West Virginia Pulp & Paper Co. Similar liquors, with variations in analysis, are sold by other manufacturers under other trade names. Unrefined or crude tall oil can be used, however, or even tall oil pitch such as sold by Armour & Co., and identified to the trade as "tall oil pitch D–342." In the subsequent description and claims the expression "tall oil," without modification, is used in a generic sense to designate tall oil pitch and tall oil, both crude and refined.

The preferred embodiment of the invention comprises equal parts by weight of Liqro and No. 480 styrene type resin identified above. The proportions can be changed, for example, less tall oil can be used, but with the disadvantage that the melting point of the material is raised, and the resin to tall oil ratio should not be larger than two to one. On the other hand too much tall oil should not be used or the melting point of the compounding material will be too low and the material when handled at temperatures likely to be encountered in compounding rooms will be soft or even liquid. Under present practices of compounding rubber and rubber-like materials solid ingredients are preferable. The most tall oil that can be used without lowering the melting point unduly is about two parts tall oil to one part of the styrene type resin.

The resin seems to be emulsified in the mixture and therefore retains original characteristics which are advantageous in rubber compounds, but cannot be taken advantage of directly because of the high melting point of the resin.

The material of this invention, identified as 480-tall oil may be compounded with GR–S (Buna S) as follows:

| | Parts by weight |
|---|---|
| GR–S (Buna S) | 100.0 |
| 480-tall oil | 20.0 |
| Santocure | 1.5 |
| Santoflex B | 2.0 |
| Zinc oxide | 5.0 |
| Sulphur | 2.0 |
| Carbon black (Cabot #9) | 40.0 |

This compound when cured for 60 minutes at 52 pounds has a tensile strength of 2900 pounds per square inch, an elongation of 780%, and a hardness of 60.

The above table is for purposes of illustration only and not to be taken in a limiting sense. It can be changed by using between 10 and 50 parts of the compounding material including the tall oil and styrene type resin. If larger quantities of the compounding material of this invention are used, the material serves as an extender and when as much as 50 parts of the material are used, it is without appreciable impairment of the physical characteristics of the vulcanizate.

The material has remarkable dielectric properties which make it especially suitable for use in rubber or rubber-like compounds that are to be used for insulation.

The preferred embodiment of the invention and some modifications have been described, but others can be made within the scope of the appended claims.

What is claimed is:

1. A reinforcing compounding material that is solid at room temperature and that comprises a combination of tall oil and a polymerized cut of coal tar type solvent naphtha which contains polymers of styrene, polymers of the various isomeric forms of methyl styrene, and in addition contains polymers of coumarone and indene, with the polymers of styrene predominating in said cut of coal tar, and in which the ratio of tall oil to the polymerized cut of coal tar type solvent naphtha is between one to two and two to one.

2. The reinforcing compounding material defined in claim 1 and in which the ratio of tall oil to the polymerized cut of coal tar is substantially one to one.

3. A solid compounding material for reinforcing rubber and rubbery copolymers of butadiene and styrene, said material comprising a combination of refined tall oil and a polymerized cut of coal tar type solvent naphtha containing polymers of styrene and of methyl styrene, and of the various isomeric forms of methyl styrene, and polymers of coumarone and indene, with the polymers of styrene predominating in said cut, the refined tall oil and polymerized cut being combined in substantially equal parts.

4. A composition of matter comprising 100 parts of a rubbery copolymer of butadiene and styrene cured with compounding materials including from 10 to 50 parts of a product which combines tall oil and a polymerized cut of coal tar solvent naphtha containing polymers of styrene, polymers of the various isomeric forms of methyl styrene, and in addition contains polymers of coumarone and indene, with the polymers of styrene predominating in said polymerized cut and the ratio of tall oil to the polymerized cut being between one to two and two to one.

5. The composition of matter defined in claim 4 and in which the ratio of tall oil to the polymerized cut of coal tar is substantially one to one.

CLIFFORD GRANVILLE LA CROSSE.

REFERENCES CITED

The following references are of record in the file of this patent:

UNITED STATES PATENTS

| Number | Name | Date |
|---|---|---|
| 1,975,179 | Smith | Oct. 2, 1934 |
| 2,224,837 | Rosenthal et al. | Dec. 10, 1940 |
| 2,235,462 | Murdock | Mar. 18, 1941 |
| 2,249,458 | Croasdale | July 15, 1941 |
| 2,307,037 | Gumlich et al. | June 5, 1943 |

FOREIGN PATENTS

| Number | Country | Date |
|---|---|---|
| 618,592 | Greece | Sept. 11, 1935 |

OTHER REFERENCES

Plastic Institute, "Plastic Trends," vol. 2, No. 15, Aug. 1, 1942.